United States Patent [19]
Itoh et al.

[11] Patent Number: 5,907,019
[45] Date of Patent: May 25, 1999

[54] POLYMER-COMPATIBLE POLYMETHYLSILSESQUIOXANE

[75] Inventors: Maki Itoh, Kanagawa; Akihito Sakakibara-Saitoh, Shizuoka; Michitaka Suto, Kanagawa, all of Japan

[73] Assignee: Dow Corning Asia, Ltd., Tokyo, Japan

[21] Appl. No.: 08/977,701

[22] Filed: Nov. 25, 1997

[30] Foreign Application Priority Data

Nov. 28, 1996 [JP] Japan ........................................ 317776

[51] Int. Cl.$^6$ .................................................. C08F 283/12
[52] U.S. Cl. ............................................. 525/477; 528/34
[58] Field of Search .............................. 525/477; 528/34, 528/10; 524/773, 770, 751, 755, 765

[56] References Cited

U.S. PATENT DOCUMENTS

| | | | |
|---|---|---|---|
| 4,349,609 | 9/1982 | Takeda et al. ........................ | 428/429 |
| 4,399,266 | 8/1983 | Matsumura et al. ................... | 528/10 |
| 4,652,618 | 3/1987 | Sumida ................................ | 525/478 |
| 4,895,914 | 1/1990 | Saitoh et al. ......................... | 525/478 |
| 5,491,203 | 2/1996 | Matsui et al. ........................ | 525/474 |

FOREIGN PATENT DOCUMENTS

| | | |
|---|---|---|
| 868996 | 4/1971 | Canada .................................... 402/24 |
| 0406911 A1 | 1/1991 | European Pat. Off. . |
| 0 786 489 A1 | 7/1997 | European Pat. Off. . |
| 61-221232 | 10/1986 | Japan . |
| 3-203331 | 1/1991 | Japan . |
| 3-227321 | 10/1991 | Japan . |
| 5-125187 | 5/1993 | Japan . |
| 6-279586 | 10/1994 | Japan . |
| 6-287307 | 10/1994 | Japan . |
| 7-70321 | 3/1995 | Japan . |

OTHER PUBLICATIONS

Wacker–Chemie GmbH; Munich, Mar. 1984; Methyl Silicone Resins; SME 10–152.831.
Wacker–Chemie GmbH; Munich, Jan. 1983; Wacker Silicone Resin Solution HK 15; SME 10–152.831.
Wacker–Chemie GmbH; Wacker Silicone Resin MK (Methyl polysiloxane); SME 10–146.8110 (replacing SME 10–114.793).
"Shirikoon Handobukku" (English Title: Silicone Handbook), Edited by Kunio Itoh, Published by Nikkan Kogyo Shinbunsha (1990).
J. Am. Chem. Soc., 1990, 112, pp. 1931–1936.

*Primary Examiner*—Robert Dawson
*Assistant Examiner*—Caixia Lu-Rutt
*Attorney, Agent, or Firm*—Arne R. Jarnholm; Timothy J. Troy

[57] ABSTRACT

A silylated polymethylsilsesquioxane, that contains no more than 0.12 residual silanol per Si atom and has a predetermined number average molecular weight from 380 to 2,000 is obtained by silylating the silanol in a starting polymethylsilsesquioxane with the formula $$(CH_3SiO_{3/2})_n(CH_3Si(OH)O_{2/2})_m$$

wherein m and n are positive numbers that provide the specified molecular weight and $0.034/(M \times 10^{-3}) \leq m/(m+n) \leq 0.152/(M \times 10^{-3}) + 0.10$. The silylated polymethylsilsesquioxanes of the present invention exhibit compatibility with silicone polymers, e.g., polydimethylsiloxanes. As a consequence, the silylated polymethylsilsesquioxanes of the invention can be used in a wide range of applications as, for example, a reinforcing filler for rubbers.

7 Claims, 1 Drawing Sheet

POLYMER-COMPATIBLE POLYMETHYLSILSESQUIOXANE

BACKGROUND OF THE INVENTION

1. Field of the Invention

This invention relates to: 1) compositions of silylated polymethylsilsesquioxane that are compatible with polymers, for example, polydimethylsiloxanes; 2) to a method for the preparation of said silylated polymethylsilsesquioxane compositions; and 3) to compositions that use the silylated polymethylsilsesquioxane compositions.

2. Description of the Prior Art

Silicone resins that contain 1.5 oxygen atoms per silicon atom are generically known as polysilsesquioxanes. Polysilsesquioxanes are highly heat-resistant and exhibit good electrical insulation properties and flame retardancy, and this good property spectrum has resulted in their use as resist materials and interlayer dielectric films in semiconductor fabrication (see, among others, "Shirikoon Handobukku" (English title: Silicone Handbook), edited by Kunio Itoh, published by Nikkan Kogyo Shinbunsha (1990)).

Methods are already known for the synthesis of polymethylsilsesquioxane. For example, polymethylsilsesquioxane can be synthesized by dissolving methyltrichlorosilane in the presence of an amine in a single solvent or mixture of solvents selected from ketones and ethers, adding water to this system dropwise to effect hydrolysis, and then heating to effect condensation (see Japanese Patent Publication (Kokoku) Numbers Sho 60-17214 (17,214/1985) and Hei 1-43773 (43,773/1989) and U.S. Pat. No. 4,399,266). Another synthesis example is taught in EP 0 406 911 A1 and Japanese Patent Publication (Kokoku) Number Sho 62-16212 (16,212/1987). These references teach the dissolution of a trifunctional methylsilane in an organic solvent; then hydrolysis by the dropwise addition of water to this solution at a temperature from −20° C. to −50° C. under an inert gas pressure of 1,000 to 3,000 Pa; and thereafter condensation by heating. Yet another synthesis example is disclosed in Japanese Patent Application Laid Open (Kokai or Unexamined) Number Hei 3-20331 (20,331/1991). This reference teaches the reaction, in organic solvent, of methyltriacetoxysilane with an equivalent amount of alcohol and/or water to synthesize the alkoxyacetoxysilane; polycondensation of the alkoxyacetoxysilane in organic solvent in the presence of sodium bicarbonate to give a prepolymer; and condensation of this prepolymer by heating in the presence of at least 1 catalyst selected from the alkali metal hydroxides, alkaline-earth metal hydroxides, alkali metal fluorides, alkaline-earth metal fluorides, and triethylamine. Yet another synthesis example is found in Japanese Patent Application Laid Open (Kokai or Unexamined) Number Hei 3-227321 (227,321/1991). This reference teaches the dissolution of alkali metal carboxylate and lower alcohol in a mixed liquid system that forms two phases (water and hydrocarbon solvent); the dropwise addition of methyltrihalosilane into this system to effect hydrolysis; and condensation by heating.

The polymethylsilsesquioxanes afforded by these methods share a characteristic feature: they are hard but brittle. Some of the preceding references even include tactics for addressing this problem. Japanese Patent Publication (Kokoku) Number Hei 1-43773 instructs regulating the fraction with molecular weight $\leq 20,000$ (molecular weight as determined by gel permeation chromatography (GPC) calibrated with polystyrene standards) to 15 to 30 weight % of the polymethylsilsesquioxane.

However, even this does no more than enable the preparation of coatings with thicknesses of about 1.8 to 2.0 $\mu$m. Similarly, the technology in EP 0 406 911 A1 can only provide films with maximum thicknesses of 3 to 3.5 $\mu$m without cracking. At larger film thicknesses cracking occurs, and of course the flexibility that would permit the fabrication of an independent film is absent.

We have already discovered (see EP 786 489 A1 and WO 9707164) that a coating that combines flexibility with high thermal stability is provided by the cure of a polymethylsilsesquioxane having a molecular weight and hydroxyl content in specific ranges and preferably prepared by a special method.

A method for the silylation of the residual silanol in polysilsesquioxane is provided in, for example, J. Am. Chem. Soc., 1990, 112, pages 1931 to 1936. Japanese Patent Application Laid Open [Kokai or Unexamined] Number Sho 61-221232 (221,232/1986) teaches a method for the preparation of silylated polysilsesquioxane comprising the use of silylating agent to terminate the reaction in the polysilsesquioxane synthesis method of EP 0 406 911 A1 and Japanese Patent Publication (Kokoku) Number Sho 62-16212. Japanese Patent Application Laid Open (Kokai or Unexamined) Numbers Hei 6-279586 (279,586/1994), Hei 6-287307 (287,307/1994), and Hei 7-70321 (70,321/1995) teach that stabilization can be achieved and gelation can be avoided by trimethylsilylation of the hydroxyl in polysilsesquioxane in which methyl constitutes 50 to 99.9 mole % of the pendant organic groups and crosslinking-reactive groups are present in the remaining organic groups. However, even without silylation the polymethylsilsesquioxane disclosed by us in EP 786 489 A1 and WO 9707164 does not gel during its preparation and can be stably stored at room temperature. Japanese Patent Application Laid Open (Kokai or Unexamined) Number Hei 5-125187 (125,187/1993) teaches that an increased storage stability can be obtained by trialkylsilylation of the hydroxyl in polysilsesquioxane having Mn$\geq$100,000 and methyl as 50 to 100 mole % of its pendant organic groups. The above-referenced Japanese Patent Publication (Kokoku) Number Sho 62-16212 also teaches that silylation of the hydroxyl in polymethylsilsesquioxane improves stability.

SUMMARY OF THE INVENTION

The polymethylsilsesquioxane disclosed by us in EP 786 489 A1 and WO 9707164 contains a large number of silanol groups but also exhibits an excellent storage stability. The cured product afforded by this polymethylsilsesquioxane exhibits a very high heat stability and also exhibits a flexibility that is largely unachievable by the cured products afforded by prior polymethylsilsesquioxanes. This high heat stability can be explained, inter alia, by the fact that the crosslink density for whatever reason undergoes an increase during the post-cure period. This phenomenon should stand in direct opposition to the manifestation of flexibility by the cured film, and the manifestation of both these properties, i.e., flexibility and heat stability, is a unique characteristic of the polymethylsilsesquioxane under consideration. However, due to its silanol groups the subject polymethylsilsesquioxane does not necessarily exhibit good compatibility with polymers such as, for example, polydimethylsiloxanes. The object of the present invention is therefore to provide a method for inducing compatibility between the subject polymethylsilsesquioxane with its unique characteristics and polymers such as polydimethylsiloxane in order to make possible the generation of functional effects from the addition of the former to the latter.

The composition of the invention comprises a silylated polymethylsilsesquioxane. The composition of the invention is prepared by silylating the silanol groups in a starting polymethylsilsesquioxane having a predetermined number average molecular weight, Mn, from 380 to 2,000, as determined by gel permeation chromatography calibrated with polystyrene standards. The starting polymethylsilsesquioxane composition is represented by the general formula $$(CH_3SiO_{3/2})_n(CH_3Si(OH)O_{2/2})_m$$

wherein m and n are positive numbers that provide the predetermined Mn, with the proviso that the value of $m/(m+n)$ is less than or equal to $0.152/(Mn\times10^{-3})+0.10$ and greater than or equal to $0.034/(Mn\times10^{-3})$. The silylated polymethylsilsesquioxane of the invention has the formula $$(CH_3SiO_{3/2})_n(CH_3Si(OH)O_{2/2})_{m-k}(CH_3Si(OSiR^1R^2R^3)O_{2/2})_k$$

wherein k is a positive number smaller than m, $(m-k)/(m+n)$ is less than or equal to 0.12, and $R^1$, $R^2$, and $R^3$ are each selected from the group consisting of unreactive, substituted and unsubstituted monovalent hydrocarbon groups. Hence, the boundary conditions for the starting polymethylsilsesquioxane are known and can be represented graphically.

The present invention also relates to a method for the preparation of the above-described silylated polymethylsilsesquioxane.

$$m/(m+n)=0.152/(Mn\times10^{-3})+0.10; \tag{1}$$

$$1/(Mn\times10^{-3})=1000/2000; \tag{2}$$

$$1/(Mn\times10^{-3})=1000/380; \text{ and} \tag{3}$$

$$m/(m+n)=0.034/(Mn\times10^{-3}). \tag{4}$$

DETAILED DESCRIPTION OF THE INVENTION

Figure 1:
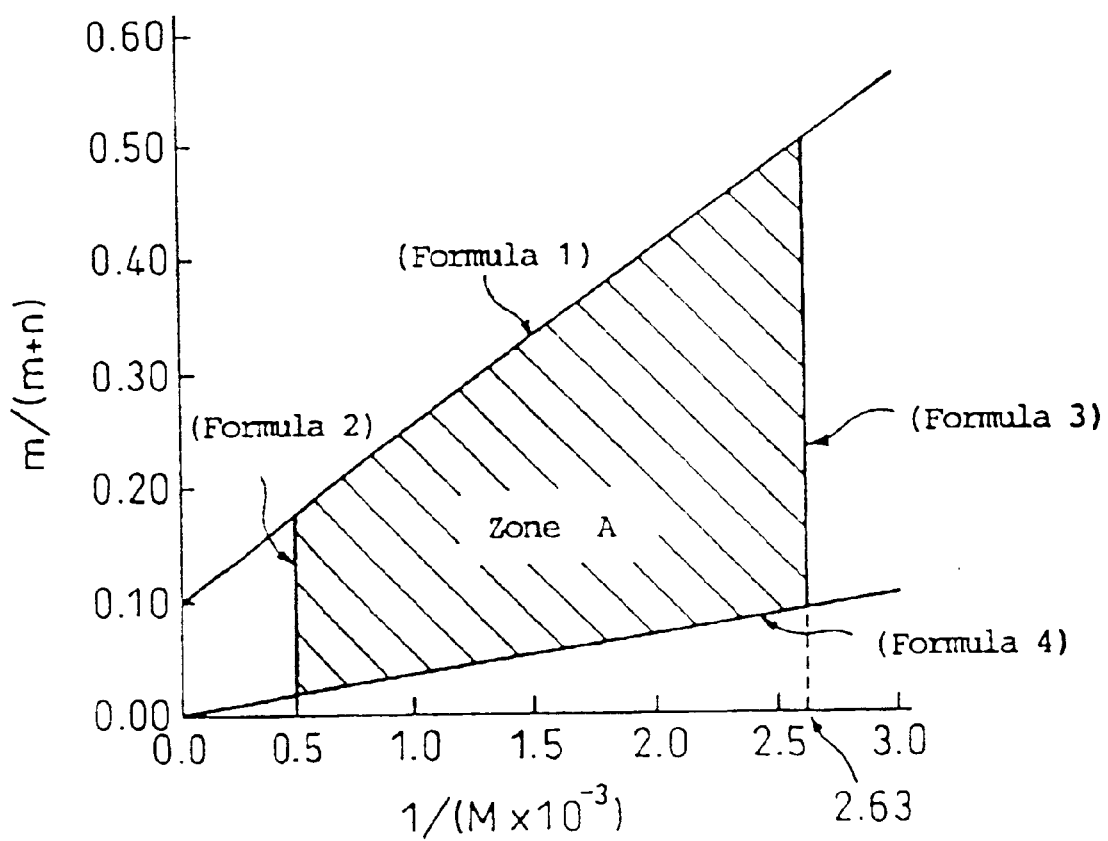
FIG. 1 is a graph of the ratio of $m/(m+n)$ vs. $1/(Mn\times10^{-3})$ of the boundary conditions of the starting polymethylsilsesquioxane used to prepare the silylated composition of the invention, represented by the general formula $(CH_3SiO_{3/2})_n(CH_3Si(OH)O_{2/2})_m$, having a predetermined Mn between 380 and 2,000, as determined by gel permeation chromatography calibrated with polystyrene standards, and being defined by the region A bounded by equations.

The starting polymethylsilsesquioxane used to prepare the silylated polymethylsilsesquioxane of the present invention, has a number-average molecular weight (Mn, polystyrene basis) from 380 to 2,000 and is represented by $$(CH_3SiO_{3/2})_n(CH_3Si(OH)O_{2/2})_m$$

where m and n are positive numbers that provide the specified molecular weight and the value of $m/(m+n)$ falls within region A in FIG. 1. Region A is the region enclosed by the straight lines with equations (1) to (4) in the graph in FIG. 1 in which the x-axis plots $1/(Mn\times10^{-3})$ and the y-axis plots $m/(m+n)$. Region A includes the intersections of the straight lines and the points on the straight lines defined by the following equations:

$$m/(m+n)=0.152/(Mn\times10^{-3})+0.25 \tag{1}$$

$$1/(Mn\times10^{-3})=1000/2000 \tag{2}$$

$$1/(Mn\times10^{-3})=1000/380 \tag{3}$$

$$m/(m+n)=0.034/(Mn\times10^{-3}) \tag{4}$$

This starting polymethylsilsesquioxane is preferably prepared in a two-phase system of water and organic solvent consisting of oxygenated organic solvent and optionally up to 50 volume % (based on the oxygenated organic solvent) hydrocarbon solvent by hydrolyzing a methyltrihalosilane MeSiX$_3$ (Me=methyl and X=halogen atom) and condensing the resulting hydrolysis product. When this preparative method is not used, the cured product afforded by the subject starting polymethylsilsesquioxane will have a reduced flexibility and/or a reduced heat resistance even when the molecular weight and silanol content satisfy the ranges specified above. In other words, polymethylsilsesquioxane with the unique characteristics described above will not be obtained.

Optimal methods for synthesizing the starting polymethylsilsesquioxane having a molecular weight and hydroxyl content in the above-specified ranges are exemplified by the following:

(1) forming a two-phase system of water (optionally containing the dissolved salt of a weak acid with a buffering capacity or a dissolved water-soluble inorganic base) and oxygenated organic solvent, optionally containing no more than 50 volume % hydrocarbon solvent, adding the below-described (A) or (B) dropwise to this system to hydrolyze the methyltrihalosilane, and effecting condensation of the resulting hydrolysis product, wherein
(A) is a methyltrihalosilane MeSiX$_3$ (Me=methyl and X=halogen atom) and
(B) is the solution afforded by dissolving such a methyltrihalosilane in oxygenated organic solvent optionally containing no more than 50 volume % hydrocarbon solvent;
(2) the same method as described under (1), but in this case effecting reaction in the two-phase system from the dropwise addition of the solution described in (B) to only water;
(3) the same method as described under (1), but in this case effecting reaction in the two-phase system from the simultaneous dropwise addition of water and the solution described in (B) to an empty reactor.

"X," the halogen in the subject methyltrihalosilane, is preferably bromine or chlorine and more preferably is chlorine. As used herein, the formation of a two-phase system of water and organic solvent refers to a state in which the water and organic solvent are not miscible and hence will not form a homogeneous solution. This includes the maintenance of a layered state by the organic layer and water layer through the use of slow-speed stirring as well as the generation of a suspension by vigorous stirring. Below these phenomena are referred to as the "formation of two layers".

The organic solvent used in the subject preparative methods is an oxygenated organic solvent that can dissolve the methyltrihalosilane and, although possibly evidencing some solubility in water, can nevertheless form a two-phase system with water. The organic solvent can contain up to 50 volume % hydrocarbon solvent.

The use of more than 50 volume % hydrocarbon solvent is impractical because this causes gel production to increase at the expense of the yield of target product. Even an organic solvent with an unlimited solubility in water can be used when such a solvent is not miscible with the aqueous solution of a water-soluble inorganic base or with the aqueous solution of a weak acid salt with a buffering capacity.

The oxygenated organic solvents are exemplified by, but not limited to, ketone solvents such as methyl ethyl ketone, diethyl ketone, methyl isobutyl ketone, acetylacetone, cyclohexanone, and so forth; ether solvents such as diethyl ether, di-n-propyl ether, dioxane, the dimethyl ether of diethylene glycol, tetrahydrofuran, and so forth; ester solvents such as ethyl acetate, butyl acetate, butyl propionate, and so forth; and alcohol solvents such as n-butanol, hexanol, and so forth. The ketone, ether, and ester solvents are particularly preferred among the preceding. The oxygenated organic solvent may also take the form of a mixture of two or more selections from the preceding. The hydrocarbon solvent is exemplified by, but again not limited to, aromatic hydrocarbon solvents such as benzene, toluene, xylene, and so forth; aliphatic hydrocarbon solvents such as hexane, heptane, and so forth; and halogenated hydrocarbon solvents such as chloroform, trichloroethylene, carbon tetrachloride, and so forth. The quantity of the organic solvent used is not critical, but preferably is in the range from 50 to 2,000 weight parts per 100 weight parts of the methyltrihalosilane. The use of less than 50 weight parts organic solvent per 100 weight parts methyltrihalosilane is inadequate for dissolving the starting polymethylsilsesquioxane product and, depending on the circumstances, will not give a starting polymethylsilsesquioxane having the desired molecular weight range, resulting in too high a molecular weight. The use of more than 2,000 weight parts organic solvent can lead to slow the hydrolysis and condensation of the methyltrihalosilane and hence result in the failure to obtain a starting polymethylsilsesquioxane in the desired molecular weight range. While the quantity of water used is also not critical, the water is preferably used at from 10 to 3,000 weight parts per 100 weight parts methyltrihalosilane.

Hydrolysis and condensation reactions are also possible even with the use of entirely additive-free water as the aqueous phase. However, such a system will give a polymethylsilsesquioxane product with an elevated molecular weight because the reaction is accelerated by the hydrogen chloride evolved from the chlorosilane. Polymethylsilsesquioxane with a relatively lower molecular weight can therefore be synthesized through the addition of water-soluble inorganic base capable of controlling the acidity or a weak acid salt with a buffering capacity.

Such water-soluble inorganic bases are exemplified by water-soluble alkalis such as the lithium, sodium, potassium, calcium, and magnesium hydroxides. The subject weak acid salt with a buffering capacity is exemplified by, but not limited to, carbonates such as the sodium, potassium, calcium, and magnesium carbonates; bicarbonates such as the sodium and potassium bicarbonates; oxalates such as potassium trihydrogen bis(oxalate); carboxylates such as potassium hydrogen phthalate and sodium acetate; phosphates such as disodium hydrogen phosphate and potassium dihydrogen phosphate; and borates such as sodium tetraborate. These are preferably used at $\leq 1.8$ gram-equivalents per 1 mole halogen atoms from the trihalosilane molecule. In other words, these are preferably used at up to 1.8 times the quantity that just neutralizes the hydrogen halide that is produced when the halosilane is completely hydrolyzed. The use of larger amounts facilitates the production of insoluble gel. Mixtures of two or more of the water-soluble inorganic bases and mixtures of two or more of the buffering weak acid salts can be used as long as the total is within the above-specified quantity range.

The methyltrihalosilane hydrolysis reaction bath can be stirred slowly at a rate that maintains two layers (aqueous phase and organic solvent) or can be strongly stirred so as to give a suspension. The reaction temperature is suitably in the range from room (20° C.) temperature to 120° C. and is preferably from about 40° C. to 100° C.

The starting polymethylsilsesquioxane according to the present invention may contain small amounts of units that originate from impurities that may be present in the precursors, for example, units bearing non-methyl lower alkyl, monofunctional units as represented by $R_3SiO_{1/2}$, difunctional units as represented by $R_2SiO_{2/2}$, and tetrafunctional units as represented by $SiO_{4/2}$. The starting polymethylsilsesquioxane under consideration contains the OH group and has the structure specified by the structural formula given above; however, it may also contain very small levels of OH-functional units with structures other than that specified in the said structural formula. Thus, the polymethylsilsesquioxane according to the present invention has a structure that substantially satisfies the conditions specified hereinabove, but it may also contain structural units generated by the causes outlined above within a range that does not impair the characteristic features of said polymethylsilsesquioxane.

The $R^1$, $R^2$, and $R^3$ in the silyl group that silylates the hydroxyl site in the starting polymethylsilsesquioxane are each selected from unreactive, substituted and unsubstituted monovalent hydrocarbon groups, for example, alkyl such as methyl, ethyl, and propyl; aryl such as phenyl; and organic groups as afforded by halogen substitution in the preceding.

The technique for silylating the hydroxyl in the starting polymethylsilsesquioxane with silyl bearing unreactive substituents is exemplified by reaction with trialkylhalosilane; use of a nitrogenous silylating agent such as, for example, hexaalkyldisilazane, N,N-diethylaminotrialkylsilane, N-(trialkylsilyl)acetamide, N-methyl(trialkylsilyl) acetamide, N,O-bis(trialkylsilyl)acetamide, N,O-bis (trialkylsilyl)carbamate, and N-trialkylsilylimidazole; reaction with trialkylsilanol; and reaction with hexaalkyldisiloxane in a weakly acidic mnilieu. In the case of reaction with trialkylhalosilane, a base can also be present in the system in order to neutralize the hydrogen halide by-product. In the case of reaction with a nitrogenous silylating agent, a catalyst such as trimethylchlorosilane or ammonium sulfate can be added.

The silylation reaction under consideration can be run in the absence or presence of solvent. Solvents suitable for this reaction are, for example, aromatic hydrocarbon solvents such as benzene, toluene, and xylene; aliphatic hydrocarbon solvents such as hexane and heptane; ether solvents such as diethyl ether and tetrahydrofuran; ketone solvents such as acetone and methyl ethyl ketone; ester solvents such as ethyl acetate and butyl acetate; halogenated hydrocarbon solvents such as chloroform, trichloroethylene, and carbon tetrachloride; dimethylformamide; and dimethyl sulfoxide.

The subject silylation reaction is suitably run at from 0° C. to 200° C. and preferably at from 0° C. to 140° C.

Due to its good compatibility with polyorganosiloxanes, the silylated polymethylsilsesquioxane prepared as described above can be used to prepare compositions. As long as the particular polyorganosiloxane exhibits good miscibility with the subject silylated polymethylsilsesquioxane of the invention, the characteristics of the polyorganosiloxane are not otherwise critical. The polyorganosiloxane has a viscosity from about 9,000 centistokes to about 10 million centistokes at 25° C. Typical examples of applicable polyorganosiloxanes are provided below, but these examples should not be construed as exhaustive.

(i) Dimethylpolysiloxanes

These are organopolysiloxanes with the general formula $R^1{}_aSiO_{(4-a)/2}$ ($R^1$=methyl, $1.8 \leq a \leq 2.3$) that have a viscosity at 25° C. from 100 to 100,000 centipoise and preferably from 100 to 50,000 centipoise and more preferably from 300 to 10,000 centipoise.

(ii) Phenyl-bearing organopolysiloxanes

These are organopolysiloxanes with the general formula $R^1{}_aR^2{}_bSiO_{(4-a-b)/2}$ ($R^1$=phenyl, $R^2=C_1$ to $C_3$ alkyl, a is a number that provides at least two $R^1$ in each molecule, and $1.8 \leq a \leq b \leq 2.3$) that have a viscosity at 25° C. from 100 to 100,000 centipoise and preferably from 100 to 50,000 centipoise and more preferably from 300 to 10,000 centipoise.

(iii) Alkenyl-functional Organopolysiloxanes

These are organopolysiloxanes with the general formula $R^1{}_aR^2{}_bSiO_{(4-a-b)/2}$ ($R^1$=alkenyl, $R^2=C_1$ to $C_3$ alkyl, a is a number that provides at least two $R^1$ in each molecule, and $1.8 \leq a+b \leq 2.3$) that have a viscosity at 25° C. from 100 to 100,000 centipoise and preferably from 100 to 50,000 centipoise and more preferably from 300 to 10,000 centipoise.

The alkenyl-functional organopolysiloxanes can be exemplified by the following structures.

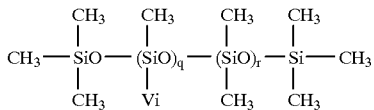

(Vi=vinyl and q and r are numbers within a range that satisfies the conditions given above)

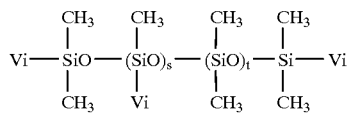

(Vi=vinyl and s and t are numbers within a range that satisfies the conditions given above)

(iv) Organohydrogenpolysiloxanes

These are organohydrogenpolysiloxanes with the general formula $R_aH_bSiO_{(4-a-b)/2}$ ($R=C_1$ to $C_3$ alkyl, b is a number that provides at least three hydrogen atoms in each molecule, and $1.8 \leq a+b \leq 2.3$) that have a viscosity at 25° C. from 1 to 100,000 centipoise and preferably from 100 to 50,000 centipoise and more preferably from 1,000 to 10,000 centipoise.

The organohydrogenpolysiloxanes can be exemplified by the following structures.

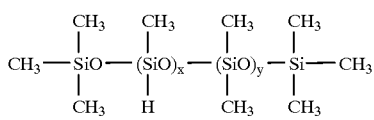

(x and y are numbers within a range that satisfies the conditions given above)

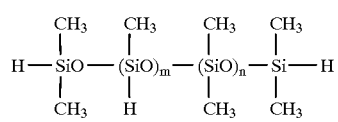

(m and n are numbers within a range that satisfies the conditions given above)

These polyorganosiloxanes may contain various other substituents as long as the above-described compatibility condition is satisfied. These other substituents are nonexhaustively exemplified by amino, nitro, mercapto, carboxyl, acyl, amide, glycidoxy, aromatic hydrocarbon, and $C_4$ to $C_{12}$ alkyl groups.

The subject polyorganosiloxanes may also be copolymers with, for example, polyalkylene oxide, e.g., polyethylene oxide or polypropylene oxide, and may contain tetrafunctional and/or trifunctional units, again as along as the above-described compatibility condition is in each case satisfied.

EXAMPLES

The present invention is explained in greater detail in the following through working and comparative examples, but is not limited to these examples.

Reference Example 1

63.5 g (0.60 mol) sodium carbonate and 400 mL water were introduced into a reactor equipped with a reflux condenser, addition funnel, and stirrer 400 mL methyl isobutyl ketone was added while stirring. The stirring rate was sufficiently slow that the organic layer and aqueous layer remained intact. Into this was gradually added 74.7 g (0.5 mol) methyltrichlorosilane dropwise from the addition funnel. During this period the temperature of the reaction mixture rose to 50° C. The reaction mixture was then heated and stirred on an oil bath at 60° C. for an additional 24 hours. After completion of the reaction, the organic layer was washed with water until the wash water reached neutrality and was then dried over a drying agent. The drying agent was subsequently removed and the solvent was distilled off at reduced pressure. Drying overnight in a vacuum then gave starting polymethylsilsesquioxane as a white solid. The following results were obtained when the molecular weight distribution of this polymethylsilsesquioxane was measured by GPC calibrated with polystyrene standards (solvent=chloroform, columns=2×TSKgelGMH$_{HR}$-L (brand name) from Tosoh, instrument=HLC-8020 from Tosoh): weight-average molecular weight=3,270; number-average molecular weight=920. The hydroxyl group content as determined from the $^{29}$Si-NMR spectrum (measured with an ACP-300 from Bruker) was 0.22 per silicon atom (this 0.22 corresponded to the value of m/(m+n)).

Reference Example 2

While stirring 2 L water and 1.5 L methyl isobutyl ketone in a reactor as described in Reference Example 1 with sufficient vigor that 2 layers did not form, 745 g (5.0 mol) methyltrichlorosilane dissolved in 0.5 L methyl isobutyl ketone was gradually added dropwise at a rate such that the temperature of the reaction mixture did not exceed 50° C. The reaction mixture was then additionally stirred and heated for 2 hours on an oil bath at 50° C. Work up as in Reference Example 1 gave a starting polymethylsilsesquioxane as a white solid. Analysis of the molecular weight distribution of this polymethylsilsesquioxane as in Reference Example 1 gave the following results: weight-average molecular weight=9,180; number-average molecular weight=1,060. 0.22 hydroxyl per silicon atom was determined.

Example 1

The interior atmosphere of a reactor equipped with a reflux condenser, addition funnel, and stirrer was replaced with argon; 5.0 g of the starting polymethylsilsesquioxane described in Reference Example 1 was added; and this polymethylsilsesquioxane was then dissolved in 15 mL toluene. 2.72 g trimethylchlorosilane was added dropwise over 1 minute while stirring and the reaction was then continued for 1 hour in an oil bath at 50° C. After terminating the reaction by the addition of water, the organic layer was washed with water until the wash water reached neutrality. The organic layer was then dried over a drying agent. The drying agent was removed and the solvent was distilled off under reduced pressure. Drying in a vacuum for 2 days gave 4.9 g trimethylsilylated polymethylsilsesquioxane as a white solid. The residual hydroxyl content as calculated from the $^{29}$Si-NMR spectrum was 0.07 per silicon atom in the silsesquioxane skeleton (this 0.07 corresponded to the value of (m−k/m+n)).

Blends of trimethylsilylated polymethylsilsesquioxane and polydimethylsiloxane were prepared by the dissolution in toluene of the trimethylsilylated polymethylsilsesquioxane described above and polydimethylsiloxane with a viscosity of 9,000 centistokes at 25° C.; applying the resulting transparent solutions onto glass plate; and then eliminating the solvent at 30° C. under reduced pressure. Blends were prepared at trimethylsilylated polymethylsilsesquioxane:polydimethylsiloxane weight ratios of 10/90, 20/80, 40/60, and 60/40. In each case a transparent blend was obtained, which was indicative of a good compatibility.

Example 2

Blends were prepared as in Example 1 using the same weight ratios as in Example 1 from the trimethylsilylated polymethylsilsesquioxane described in Example 1 and polydimethylsiloxane with a viscosity of 10 million centistokes at 25° C. In all cases transparent blends were obtained, which was indicative of good compatibility.

Example 3

Using a reactor as described in Example 1, 70 g of the starting polymethylsilsesquioxane described in Reference Example 2 was dissolved in 210 mL methyl isobutyl ketone followed by the addition of 35.4 g triethylamine. 38.3 g trimethylchlorosilane was then added dropwise over 17 minutes and the reaction was thereafter continued for 2 hours at room temperature. Work up as in Example 1 afforded 72.1 g trimethylsilylated polymethylsilsesquioxane as a white solid. The content of residual hydroxyl as determined from the $^{29}$Si-NMR spectrum was 0.06 per silicon atom in the silsesquioxane skeleton.

Blends were prepared as in Example 1 using the same weight ratios as in Example 1 from the above-described trimethylsilylated polymethylsilsesquioxane and polydimethylsiloxane with a viscosity of 9,000 centistokes at 25° C. In all cases transparent blends were obtained, which was indicative of good compatibility.

Example 4

Blends were prepared as in Example 1 using the same weight ratios as in Example 1 from the trimethylsilylated polymethylsilsesquioxane described in Example 3 and polydimethylsiloxane with a viscosity of 10 million centistokes at 25° C. In all cases transparent blends were obtained, which was indicative of good compatibility.

Example 5

Polydimethylsiloxane endblocked by vinyl at both terminals (vinyl weight content=0.12%, viscosity=9,000 centistokes) and the trimethylsilylated polymethylsilsesquioxane synthesized in Example 3 were dissolved in toluene at an 80:20 weight ratio. A solution was then prepared by the addition of a platinum-divinyltetramethyldisiloxane complex at 200 ppm platinum atoms based on the vinyl group, 2-methyl-3-butyn-2-ol at 10-fold (molar) to the preceding; and crosslinker with the formula

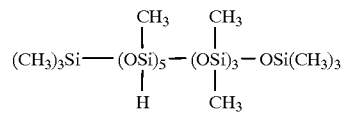

in sufficient quantity to provide 2-fold (molar) —SiO(Me)H— relative to the vinyl group. The solution was placed in a polytetrafluoroethylene mold and after solvent removal was cured by heating for 12 hours at 100° C. and 2 hours at 130° C. to give a silicone rubber film that contained the trimethylsilylated polymethylsilsesquioxane. This film was subjected to tensile testing as described in JIS K 6301. Its breaking strength was 23 kg/cm$^2$ and its elongation at break was 190%, which were better than the 5 kg/cm$^2$ breaking strength and 300% elongation at break given by the silicone rubber film prepared using the same components as above but omitting the trimethylsilylated polymethylsilsesquioxane. Yielding was not exhibited in the stress-strain curve, and the 10% modulus (stress divided by strain at 10% strain) was 1.0 MPa, which indicated a reinforcing effect since a value of 0.5 MPa was obtained in the absence of the silylated polymethylsilsesquioxane.

Dynamic tests were also run based on JIS K 6394 at a test temperature of 20° C. and a test frequency of 1 Hz. The shear modulus of the film containing the trimethylsilylated polymethylsilsesquioxane was 17 MPa, which was larger than the 13 MPa obtained in the absence of the trimethylsilylated polymethylsilsesquioxane.

Example 6

The trimethylsilylated polymethylsilsesquioxane described in Example 3 and the vinyl-endblocked polydimethylsiloxane described in Example 5 were blended at a 40:60 weight ratio. A very transparent trimethylsilylsted polymethylsilsesquioxane-containing silicone rubber film was prepared using the method of Example 5.

Dynamic tests were run based on JIS K 6394 at a test temperature of 20° C. and a test frequency of 1 Hz. The shear modulus of the film containing the trimethylsilylated polymethylsilsesquioxane was 30 MPa, which was larger than the value obtained in the absence of the trimethylsilylated polymethylsilsesquioxane.

Comparative Example 1

Blends were prepared by the method described in Example 1 using the mixing ratios specified in Example 1 from the starting polymethylsilsesquioxane described in Reference Example 1 and polydimethylsiloxane with a viscosity of 9,000 centistokes at 25° C. However, this starting polymethylsilsesquioxane was not as readily dispersible as the trimethylsilylated polymethylsilsesquioxane and the resulting blends were opaque.

Comparative Example 2

Blends were prepared by the method described in Example 1 using the mixing ratios specified in Example 1 from the starting polymethylsilsesquioxane described in Reference Example 1 and polydimethylsiloxane with a viscosity of 10 million centistokes at 25° C. However, this polymethylsilsesquioxane was not as readily dispersible as the trimethylsilylated polymethylsilsesquioxane of the invention and the resulting blends were opaque.

Comparative Example 3

A silicone rubber film was prepared by the method described in Example 5 using the starting polymethylsilsesquioxane described in Reference Example 2. The resulting sample was nonuniform in its character and could not be subjected to the mechanical property measurements.

What is claimed is:

1. A composition comprising
(A) a silylated polymethylsilsesquioxane, wherein the silylated polymethylsilsesquioxane is obtained by a method comprising
   (1) hydrolyzing a methyltrihalosilane having formula $CH_3SiX_3$, wherein X is a halogen atom, to form a hydrolysis product; and
   (2) condensing the hydrolysis product of (1) to form a starting polymethylsilsesquioxane,
      wherein hydrolyzing and condensing are carried out in a two-phase system of water and organic solvent, the organic solvent comprises an oxygenated organic solvent and optionally up to 50 vol % of a hydrocarbon solvent; thereby producing the starting polymethylsilsesquioxane with a predetermined number average molecular weight, Mn, from 380 to 2,000, as determined by gel permeation chromatography calibrated with polystyrene standards, said starting polymethylsilsesquioxane being represented by general formula $$(CH_3SiO_{3/2})_n(CH_3Si(OH)O_{2/2})_m$$

wherein m and n are positive numbers that provide the predetermined Mn, with the proviso that the value of m/(m+n) is less than or equal to $0.152/(Mn \times 10^{-3})+0.10$ and greater than or equal to $0.034/(Mn \times 10^{-3})$; thereby preparing the starting polymethylsilsesquioxane with excellent storage stability, and with flexibility when cured; and thereafter (3) silylating the starting polymethylsilsesquioxane to form a silylated polymethylsilsesquioxane,
      wherein the silylated polymethylsilsesquioxane has the formula $$(RSiO_{3/2})_n(RSi(OR^1)O_{2/2})_k(RSi(OSiR^2_3)O_{2/2})_m$$

wherein k is a positive number smaller than m, (m−k)/(m+n) is less than or equal to 1.2, and $R^1$, $R^2$, and $R^3$ are each selected from the group consisting of unreactive, substituted and unsubstituted monovalent hydrocarbon groups; and (B) an organopolysiloxane which is miscible with (A).

2. The composition of claim 1 wherein $R^1$, $R^2$, and $R^3$ are methyl groups.

3. The composition claim 1 wherein component (B) is a polydiorganosiloxane having a viscosity from about 9,000 centistokes to about 10 million centistokes at 25° C.

4. The composition of claim 3, wherein the polydiorganosiloxane is a dimethylpolysiloxane having formula $(CH_3)_a SiO_{(4-a)/2}$, where $1.8 \leq a \leq 2.3$.

5. The composition of claim 3, wherein the polydiorganosiloxane is a phenyl-bearing organopolysiloxane having formula $R^1_a R^2_b SiO_{(4-a-b)/2}$ wherein $R^1$ is a phenyl group, $R^2$ is an alkyl group of 1 to 3 carbon atoms, a is a number that provides at least two $R^1$ in each molecule, and $1.8 \leq a+b \leq 2.3$.

6. The composition of claim 3, wherein the polydiorganosiloxane is an alkenyl-functional organopolysiloxane having formula $R^1_a R^2_b SiO_{(4-a-b)/2}$ wherein $R^1$ is an alkenyl group, $R^2$ is an alkyl group of 1 to 3 carbon atoms, a is a number that provides at least two $R^1$ in each molecule, and $1.8 \leq a+b \leq 2.3$.

7. The composition of claim 3, wherein the polydiorganosiloxane is an organohydrogen polysiloxane having formula $R_a H_b SiO_{(4-a-b)/2}$ wherein R is an alkyl group having 1 to 3 carbon atoms, b is a number that provides at least three hydrogen atoms in each molecule, and $1.8 \leq a+b \leq 2.3$.

* * * * *